(12) United States Patent
Yen et al.

(10) Patent No.: US 9,003,069 B2
(45) Date of Patent: Apr. 7, 2015

(54) INPUT DEVICE FOR CONTROLLING MULTIPLE COMPUTERS AND THE CONTROLLING METHOD THEREOF

(71) Applicants: Lite-On Electronics (Guangzhou) Limited, Guangzhou (CN); Lite-On Technology Corporation, Taipei (TW)

(72) Inventors: Tao-Cheng Yen, New Taipei (TW); Er-Hao Chen, New Taipei (TW)

(73) Assignees: Lite-On Electronics (Guangzhou) Limited, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 13/793,144

(22) Filed: Mar. 11, 2013

(65) Prior Publication Data

US 2014/0040508 A1 Feb. 6, 2014

(30) Foreign Application Priority Data

Aug. 1, 2012 (CN) .......................... 2012 1 0269070

(51) Int. Cl.
| | |
|---|---|
| *G06F 3/00* | (2006.01) |
| *G06F 3/033* | (2013.01) |
| *G06F 3/02* | (2006.01) |
| *G06F 3/038* | (2013.01) |

(52) U.S. Cl.
CPC .............. *G06F 3/0227* (2013.01); *G06F 3/038* (2013.01)

(58) Field of Classification Search
CPC .............. G06F 3/038; G09G 2370/24; G09G 2320/0261; G09G 5/006
See application file for complete search history.

(56) References Cited

U.S. PATENT DOCUMENTS

2008/0307119 A1* 12/2008 Huang ........................... 710/18

* cited by examiner

*Primary Examiner* — Hyun Nam
(74) *Attorney, Agent, or Firm* — Li & Cai Intellectual Property (USA) Office

(57) ABSTRACT

An input device for controlling multiple computers includes a storing unit, a sensing unit, a controlling unit, and a transmitting unit. The controlling unit calculates a moving direction and a displacement value of the input device according to the sensing unit to determine one of the computers which the input device is in control of and generates an input command for it. The input command includes identification of the controlled computer and is transmitted to multiple computers. The computer corresponding to the identification performs the input command. The moving direction corresponds to a pointer direction of the computer. The controlling unit accumulates the displacement value to be a first accumulated displacement value when the input device moves toward to a first pointer direction. When the first accumulated displacement value is larger than a threshold value, the controlling unit switches the input device to control another one of computers.

8 Claims, 10 Drawing Sheets

INPUT DEVICE FOR CONTROLLING MULTIPLE COMPUTERS AND THE CONTROLLING METHOD THEREOF

BACKGROUND OF THE INVENTION

1. Field of the Invention

The instant invention relates to an input device and the controlling method thereof; in particular, to an input device for controlling multiple computers and the controlling method thereof.

2. Description of Related Art

In order to control multiple computers at the same time, each one of computers is operated by an individual input device that the user must ceaselessly select different input devices corresponding to the specific computer for controlling different computers. In addition, an input devices is generally connected with multiple computers through the use of a computer switcher (such as KVM), and selecting different switches on the KVM switcher to control the selected computer to avoid installing multiple input devices for multiple computers.

Besides, if the input device is connected with the computer via a conventional wireless communication technology, such as the computer and the input device with Blue tooth communication, the input device must be pairing with the computer previously and then the input device can be operated. If the input device with the same Bluetooth communication is switched to another computer, it is inconvenient for the user to switch the identification of the input device and pair the input device with another computer once more.

In short, based on the aforementioned technique, the user must process a plurality of trivial and complicated steps to set each switch when he wants to switch the input device to the other computer and control it. It is inconvenient and time-wasting for the user to switch the input device among multiple computers.

SUMMARY OF THE INVENTION

The object of the instant invention is to provide an input device for controlling multiple computers, that the aforementioned including a storing unit, a sensing unit, a controlling unit, and a transmitting unit. Each computer is connected to a monitor. The storing unit records an identification corresponding to each computer. The sensing unit senses a displacement of the input device. The controlling unit calculates a moving direction and a displacement value of the input device according to the variation of a displacement detected by the sensing unit to determine which one of the computers is controlled by the input device, and generates an input command for the controlled computer. The input command includes the identification of the controlled computer by the input device. The transmitting unit is electronically connected with the controlling unit and transmits the input command including the identification corresponding to the controlled computer to multiple computers for performing the input command.

The moving direction corresponds to a pointer direction on the monitor of the computer controlled by the input device. The pointer direction includes a first pointer direction and a second pointer direction. The controlling unit accumulates displacement value when the input device moves continually toward a first pointer direction. When the first accumulated displacement value is larger than a threshold value, the controlling unit switches the input device to control another one of the multiple computers.

Besides, the exemplary embodiment of the instant invention provides a method for the input device to control multiple computers. The method includes calculating the moving direction and the displacement value of the controlled computer, wherein the displacement corresponds to the pointer direction on the monitor of the controlled computer; determining whether the moving direction corresponds to the first pointer direction. If the moving direction corresponds to the first pointer direction, the controlling unit accumulates the displacement value to be the first accumulated displacement value; determining whether the first accumulated displacement value is lager than a threshold value. If the first accumulated displacement value is larger than a threshold value, the controlling unit switches the input device to another one of multiple computers; generates the input command including the identification of the switched computer and transmits the input command to the switched computer. Whereby the switched computer receives the input command and executes the input command through the identification.

As described above, the exemplary embodiment of the instant invention provides an input device and a controlling method thereof, taking advantage of the moving direction and the displacement value of the input device to switch the computer and control it, and achieves the effect of easily operating and being switched quickly.

DETAILED DESCRIPTION OF THE PREFERRED EMBODIMENTS

The aforementioned illustrations and following detailed descriptions are exemplary for the purpose of further explaining the scope of the instant invention. Other objectives and advantages related to the instant invention will be illustrated in the subsequent descriptions and appended drawings.

[An Exemplary Embodiment of the Input Device Switching Multiple Computers]

Figure 1:
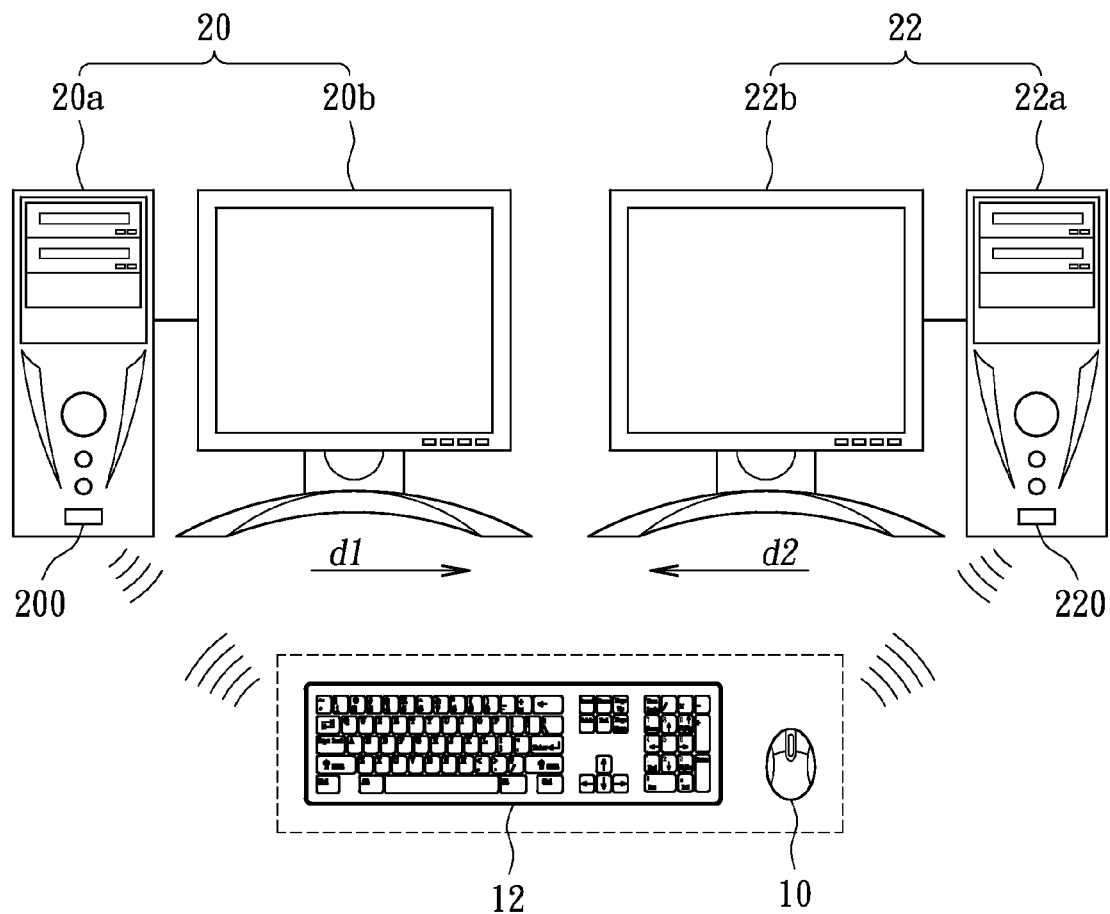
FIG. 1 is an environmental illustration of an exemplary embodiment of an input device for controlling multiple computers.

FIG. 1 shows an illustration of an exemplary embodiment of the instant invention about an input device switching multiple computers.

In the exemplary embodiment of the instant invention, the input device may be a wireless mouse 10. Besides, the input device may further include a wireless keyboard 12 to form the input device group. The input device group formed with mouse 10 and keyboard 12 may transmit the input command to a first computer or a second computer through wireless communication technology, e.g. Bluetooth communication technology, to achieve the effect that using a set of input device to control multiple computers.

In the exemplary embodiment of the instant invention, the first computer 20 includes a first host 20a and a first monitor 20b, wherein the first host 20a is also provided with a first receiver (dongle) 200 which is used for receiving the signal from the input device. The second computer 22 includes a second host 22a and the second monitor 22b, wherein the second host 22a is provided with a second receiver 220. In addition, as shown in FIG. 1, the first monitor 20b is located on the left side of the second monitor 22b.

Taking mouse 10 as the input device for example, assuming that the controlled computer 10 controlled by the mouse 10 is the first computer 20. When the mouse 10 is moved, the first host 20a receives and executes the input command from the mouse 10. Besides, the first host 20a controls the pointer to move corresponding to the moving direction and displacement value of the mouse 10 on the first monitor 20b. When the user prefers to control another computer instead of the first computer 20, such as the second computer 22, he can move the mouse 10 substantially toward the first pointer direction d1 corresponding to the first monitor 20 (in this case, mouse 10 moves right), whereby the controller in the mouse 10 (not shown in FIG. 1) determines which computer should be controlled based on the moving direction and the displacement value, so as to transmit the input command used for controlling the second computer 22. The second host 22a receives the input command by the second receiver 220, and displays the pointer corresponding to the input operation from the mouse 10 on the second monitor 22b. Similarly, if the user preferably returns to control the first computer 20 by the mouse 10, he can move the mouse 10 substantially toward the first pointer direction d2 corresponding to the second monitor 22 (in this case, mouse 10 moves left), and the controller in the mouse 10 transmits the input command used for controlling the first computer 20 based on the moving direction and the displacement value.

Wherein when the keyboard 12 and the mouse 10 as the input devices of the multiple computers 20, 22 to be operated corporately, the controller in the keyboard 12 (not shown in FIG. 1) may comply with setting on mouse 10, be switched and operated with the mouse 10 simultaneously on the same computer. In other words, the keyboard 12 transmit the input command including the same identification of the input command from the mouse 10, whereby the same computer can receive the input command from the mouse 10 and the keyboard input command from the keyboard 12.

Figure 2:
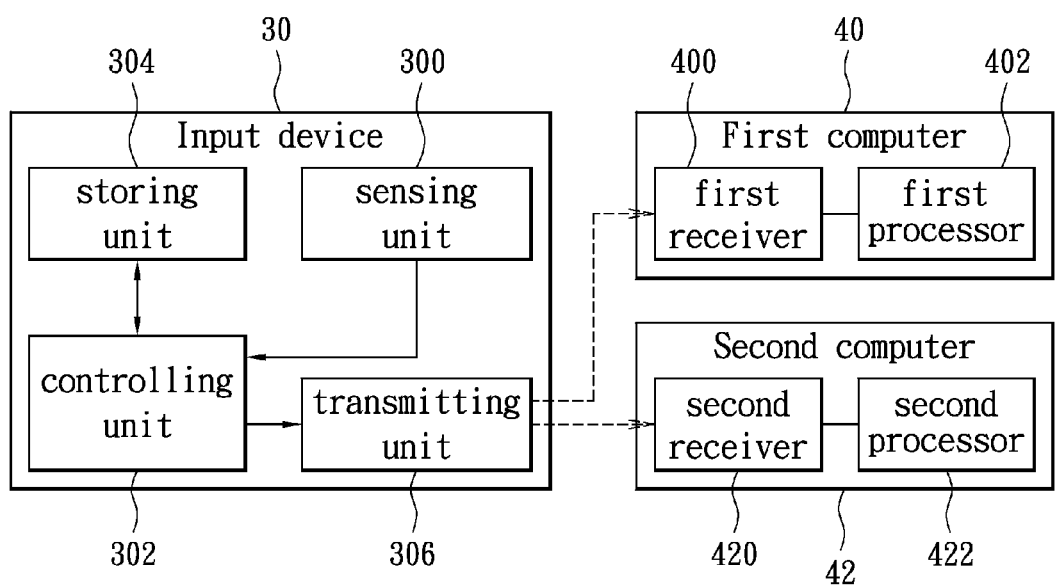
FIG. 2 is a block diagram of an exemplary embodiment of an input device for controlling multiple computers.

Please refer to FIG. 2, illustrating an implementing means for the input device switching multiple computers.

FIG. 2 shows a block diagram of an exemplary embodiment of the input device of the instant invention which can be switched among the multiple computers. The input device 30 includes a sensing unit 300, a controlling unit 302, a storing unit 304 and a transmitting unit 306. The sensing unit 300, the storing unit 304 and the transmission unit 306 are coupled with the controlling unit 302 respectively. The input device 30 may be the mouse, the touchpad device and so on The sensing unit 300 is used for detecting the variation of the displacement on the input device 30 generated by the user. For example, the sensing unit 300 may be the optical sensing module mounted on the bottom of the mouse used for detecting the variation of the displacement of the input device 30 in the vertical direction (y-axis) and in the horizontal direction (x-axis) based on the different patterns produced by the reflection of light.

The controlling unit 302 calculates the moving direction and the displacement value of the input device by receiving the variation of the displacement detected by the sensing unit 300. Specifically, the controlling unit 302 may be the processing chip, e.g. a micro-controller (MCU), or the embedded controller (EC) and so on. In the exemplary embodiment of the instant invention, the controlling unit 302 calculates the moving direction either in horizontal direction or in vertical direction of the input device, and the moving direction includes the first moving direction and the second moving direction. For example: when the moving direction is in horizontal direction, the first moving direction and the second moving direction are the horizontal directions of ascending coordinates and descending coordinates, respectively. When the moving direction is in vertical direction, the first moving direction and the second moving direction are the vertical directions of ascending coordinates and descending coordinates, respectively. The displacement value can be the difference of coordinates between the starting point and the end point of the moving direction of the input device 30, for example, the variation of the values on the horizontal (x-axis) coordinate.

Wherein the moving direction of the input device 30 can correspond to the first pointer direction and the second pointer direction mutually, for example, the first moving direction corresponds to the first pointer direction and the second moving direction corresponds to the second pointer direction; or the first moving direction corresponds to the second pointer direction and the second moving direction corresponds to the first pointer direction.

After the controlling unit 302 calculates the moving direction and the displacement value of the input device 30, the controlling unit 302 transmits the input command generated in accordance with the moving direction and the displacement value. Besides the moving direction and the displacement value, the input command further includes some instructions for controlling the computer, for example, the command of clicking generated by pressing the button of the mouse or the command of scrolling generated by rotating the wheel. Additionally, the embodiment of the input device 30 is used commonly by the multiple computers 40, 42. Thus, the input command must include the identification data of one of the multiple computers for controlling, for example, a set of identification code for determining whether the computers 40, 42 execute the received input command.

The storing unit 304 is commonly used for storing the identification of each computer. The storing unit 304 may be various memory chips which store the recoded identification over a long period of time, for example, the memory chip may be the non-volatile memory, e.g. the flash memory and so on. Wherein each computer controlled by the same input device contains its unique and non repeated identification recorded in the storing unit 304.

The transmitting unit 306 is used for transmitting the input command generated by the controlling unit 302 to each computer of the common input device 30, for example, the instant embodiment of the first computer 40 and the second computer 42. The first receiver 420 of the first computer 40 and the second receiver 420 of the second computer 42 receive the input command, respectively. The transmitting unit 306 may be the wireless signal transmission module, for example, Bluetooth module chip or infrared module chip. The first receiver 400 and the second receiver 420 may include the wireless signal receiving module correspond to the transmitting unit 306 to receive the input command.

The first receiver 400 and the second receiver 420 may determine whether the input command is transmitted to the relative processor for analyzing and executing based on the identification of the input command. When the identification of the input command includes the identification of the first computer 40, the first receiver 400 will transmit the input command to the first processor 402, and the first computer 40 will be a computer controlled by the input device 30. When the first processor 402 receives the input command, it moves the position of the pointer on the monitor, opens files, or scrolls the web page according to moving direction, the displacement value, clicking command, or scrolling command in the input command. When the identification of the second computer 42 is not identical to the identification of the input device checked by the second receiver 402, the input command is determined that it is not used for controlling the second computer 42 and will not be transmitted to the second processor 402. At this moment, the second computer 42 is not a computer controlled by the input device.

Whereby the first computer 40 and the second computer 42 may be operated commonly by the same input device 30 and at the same time the input device 30 will transmit the input command to only one of the above computers to avoid conflicting with other computers.

Particularly, in the exemplary embodiment of the instant invention, when the input device 30 is switched to the controlled computer, it is based on the moving magnitude and the moving direction of the input device 30 to determine whether the input device 30 is switched to another computer. The first moving direction and the second moving direction correspond to the moving direction of the pointer of the controlled computer, respectively. Wherein the controlling unit 302 can determine whether the moving direction of the input device 30 corresponds to the first pointer direction of the controlled computer (e.g. the first computer 40), and whether the displacement value corresponding to the first pointer direction is larger than the default threshold value.

Figure 3:
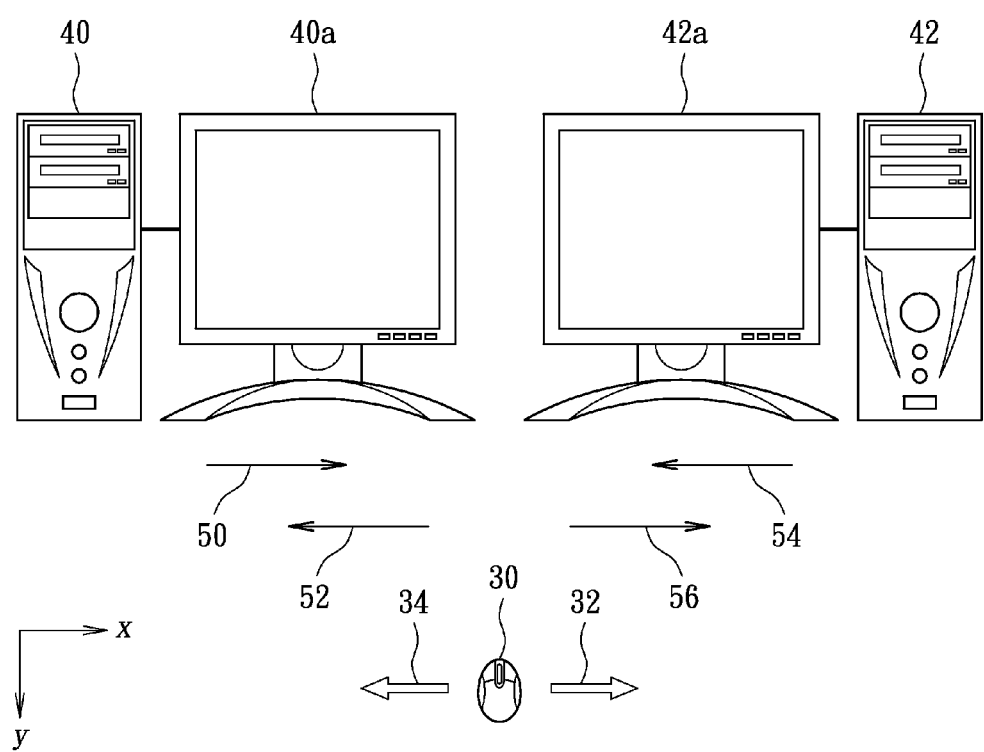
FIG. 3 is an illustration of an exemplary embodiment of an input device for controlling multiple computers.

Please Refer to FIG. 3, in conjunction with FIG. 2, which is a schematic diagram illustrating a first computer 40 connected to a first monitor 40a, and a second computer 42 connected to a second monitor 42a mounted on the right side of the first monitor 42. Each monitor coordinate origin is originated from the top left vertex of the monitor, wherein the horizontal coordinates (x-axis) is extended from the origin to the right and the vertical coordinates (y-axis) is extended downwardly from the origin.

Since the first monitor 40a and the second monitor 42a stand side by side, in the embodiment shown in FIG. 3, the user can take advantage of the variation of the horizontal displacement value of the input device 30 to determine which computer to be controlled in order to conform to the user's operating habits and intuition. Therefore, the controlling unit 302 of this case only needs to calculate the variation of the horizontal displacement value. In order to conform to the user's operating habits, the first pointer direction 50 of the first computer 40 is toward right (face the first monitor 40a) wherein the direction is toward the second monitor 42a, and the second pointer direction 52 opposite to the first pointer direction 50 is toward left. On the other hand, the first pointer direction 54 of the second computer 42 is toward left wherein the direction is toward the first monitor 40a, and the second pointer direction 56 opposite to the first pointer direction 54 is toward right.

Assuming that, in the instant embodiment, the first moving direction 32 of the input device 30 corresponding to the first pointer direction 50 of the first computer 40 is toward right, and the second moving direction 34 corresponding to the second pointer direction 52 is toward left. When the input device 30 is moved toward the first moving direction 32, the processor of the first computer 40 will control the pointer on the first monitor 40a to move toward the first pointer direction. Additionally, the first moving direction 32 of the input device 30 corresponding to the second pointer direction 56 of the second computer 42 is toward right, and the second moving direction 34 corresponding to the first pointer direction 54 of the second computer 42 is toward left.

Whereby when the user prefers to switch the input device 30 from the controlled computer (In the instant embodiment, the first computer 40) to another computer (In the instant embodiment, the second computer 42) to control it, he can move the input device 30 toward the first moving direction 32 and makes the moving magnitude larger than the threshold value under the condition that the first computer 40 is still in control. The controlling unit 302 (refer to FIG. 2) calculates the moving direction and the displacement value of the input device 30 based on the variation of the movement detected by the sensing unit 300. When the moving direction of the input device 30 corresponds the first moving direction 32 (e.g. moving rightward based on the increase in the value of the x-axis coordinate), the controlling unit 302 will further accumulate the displacement value to be a first accumulated displacement value when the input device 30 moves continuously toward the first pointer direction and determine whether the first accumulated displacement value is larger than the threshold value. Wherein the threshold value may be default and stored in the storing unit 304, for example, it may be the value which is larger than the maximum resolution of each computer of the common input device 30, e.g. 3000 pixels. When the first accumulated displacement value is larger than the threshold value, in other words, the user generates a substantial moving toward the first pointer direction 50 of the first computer 40 on the input device 30, the controlling unit 302 determines that the input device 30 is switched to the second computer 42 to control it.

When the controlling unit 302 determines that the input device 30 should be switched to another computer (In the instant embodiment, the second computer 42), the controlling unit 302 adds the identification of the second computer 42 to the input command according to the stored data in the storing unit 304 and transmits the input command to the multiple computers 40, 42 through the transmitting unit 306. The second computer 42 receives and executes the input command by identifying the identification of the input command.

Further, if the accumulated displacement value is not larger than the threshold value even the controlling unit 302 determines that the input device 30 is in control of the first computer 40 and moves continuously toward the first moving direction 32 corresponding to the first pointer direction 50, or the input device 30 moves toward the second moving direction 34 corresponding to the second pointer direction 52 (that is, determine that the input device 30 moves toward left based on descending of the value of the y-axis coordinate), which represents that the user is not intent to switch the controlled computer. Thereby the added identification of the input command generated by the controlling unit 302 will be maintained to correspond to the first computer 40, and the first computer 40 receives and executes the input command transmitted from the input device 30 according to the identification.

Wherein when the input device 30 is in control of the first computer 40, it may control the pointer to be moved back and forth between the first pointer direction 50 and the second pointer direction 52 in accordance with demand of the user. In this condition, in order to avoid accumulating the displacement value corresponding to the second pointer direction 52 to be the first accumulated displacement value for the controlling unit 302 when the input device 30 moves toward the second pointer direction 52, the first accumulated displacement value will be cleared when the controlling unit 302 determines that the input device 30 moves toward the second moving direction 34 corresponding to the second pointer direction 52. For example, zeroing the first accumulated displacement value stored temporarily in the storing unit 304 or the register in the controlling unit 302. Therefore, only when the user makes the input device 30 have a substantial slide succeed to the threshold value toward the first moving direction 32 (that is, the first pointer direction 50 corresponding to the first computer 40) at one move, the input device 30 is switched to the second computer 42. The user can observe that the pointer is moved to the second monitor 42a from the first monitor 40a.

On the other hand, taking the second computer 42 as the controlled computer for example, when the input device 30 transmits the input command to the second computer 42 to control it, the controlling unit 302 determines whether the input device 30 moves toward the second moving direction 34 of the first pointer direction 54 corresponding to the second computer 42 and the accumulated displacement value toward the first pointer direction is larger than the threshold value. Similarly, the controlling unit 302 determines whether the input device should be switched to another computer (in this example, the first computer 40) to control it. Whereby the pointer will be moved toward left from the second monitor 42a till being displayed on the first monitor 40a. Conversely, when the input device 30 moves toward the first pointer direction 54 and the accumulated displacement value is not larger than the threshold value or the input device 30 moves toward the second pointer direction 56, the controlling unit 302 determines that the input device is still in control of the second computer 42, and generates an input command including the identification corresponding to the second computer 42 for the second computer 42 to receive and execute.

[Another Embodiment of the Input Device Switching Among Multiple Computers]

When the input device 30 is switched among the multiple computers, the input device 30 makes the pointer cross the arrangement of the monitor not only in horizontal but also in vertical. Please refer to FIG. 4, FIG. 4 shows that the arrangement of the first monitor 40a and the second monitor 42a is in vertical in which the second monitor 42a is set below the first monitor 40a, and each monitor is connected to the first computer 40 and the second computer 42, respectively.

Figure 4:
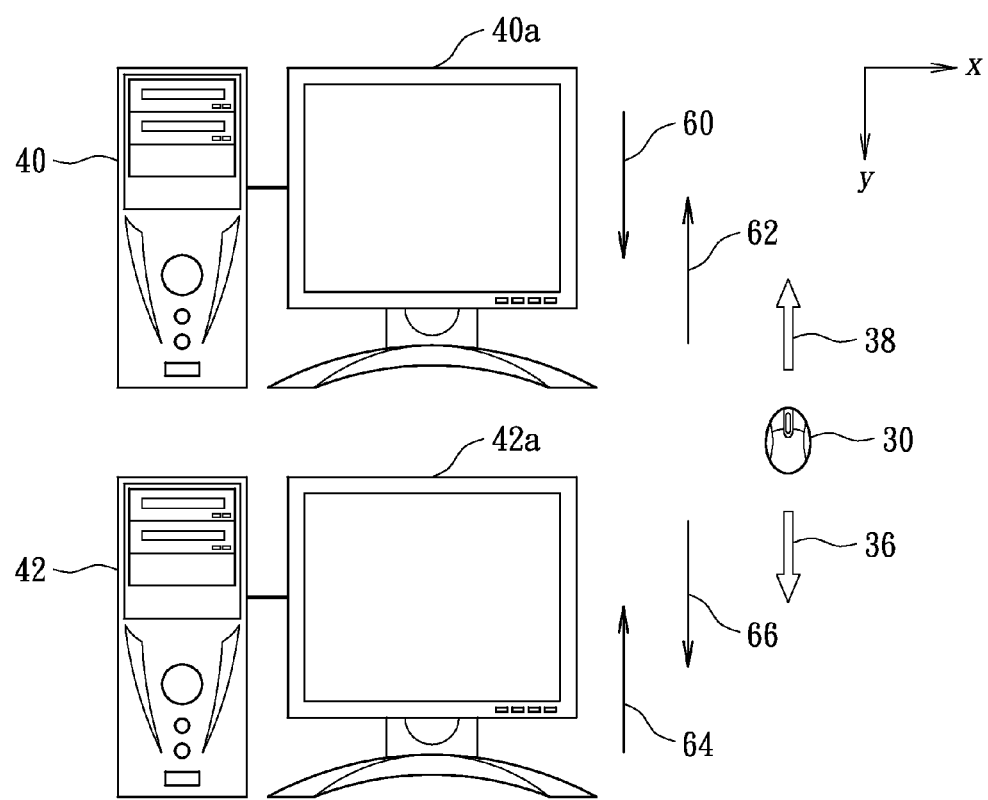
FIG. 4 is an illustration of another exemplary embodiment of an input device for controlling multiple computers.

Please refer to FIG. 4 in conjunction with FIG. 2, the controlling unit 302 determines that the input device 30 is in control of either the first computer 40 or the second computer 42, based on the moving direction and the displacement value detected by the sensing unit 300, and then shows the pointer on the corresponsive monitor. In the exemplary embodiment of the instant invention, since the arrangement of the monitors is in vertical, the controlling unit 302 can take advantage of calculating the variation of the vertical (y-axis) displacement value of the input device 30 to determine which computer to be controlled in order to conform to the user's operating habits and intuition. Therefore, the controlling unit 302 of this case only needs to calculate the variation of the vertical displacement value. In other words, in the exemplary embodiment of the instant invention, the controlling unit 302 determines that the first moving direction 36 when the input device moves backward, and the second moving direction 38 when the input device moves forward.

As FIG. 4 shown, the first pointer direction 60 of the first computer 40 may be the direction of ascending y coordinates of the first monitor 40a toward the second monitor 42a, which is corresponding to the first moving direction 36 of the input device 30. The second pointer direction 62 corresponding to the second moving direction 38 may be the direction of descending y coordinates. Relatively, the first pointer direction 64 of the second computer 42 may be the direction of descending y coordinates of the second monitor 42a toward the first monitor 40a, which is corresponding to the second moving direction 38 of the input device 30. The second pointer direction 66 corresponding to the first moving direction 36 may be the direction of descending y coordinates of the second monitor 42a.

When the input device 30 is in control of the first computer 40 (the controlled computer) and moves back, the controlling unit 302 determines the vertical moving direction corresponding to the input device 30 to be the first moving direction 36 and calculates the displacement value thereof. The controlling unit 302 accumulates the displacement value to be the first accumulated displacement value when the input device 30 moves toward the firs pointer direction 60, and determines whether the first accumulated displacement value is larger than the threshold value. That is, the controlling unit 302 determines whether the user switches the input device 30 to another computer (the second computer 42 shown in FIG. 4) from the first computer 40. When the input device 30 is in control of the second computer 42 and moves forth, the controlling unit 302 determines that the moving direction corresponding to the input device 30 to be the second moving direction 38. Whereby calculating the displacement value when the pointer moves toward the first pointer direction 64 on the second monitor 42a to be the first accumulated displacement value.

When the first accumulated displacement value is larger than the threshold value, the controlling unit 302 determines that the input device 30 should be switched to another computer. When the first accumulated displacement value is not larger than the threshold value or the moving direction of the input device 30 corresponds to the second pointer direction of the controlled computer, the input device 30 does not be switched to another computer.

In the instant embodiment, the other characteristics of the input device 30 are as same as or similar to the aforementioned embodiment is referred to the aforementioned embodiment and the description is therefore omitted.

[A Further Embodiment of the Input Device Switching Among Multiple Computers]

Figure 5:
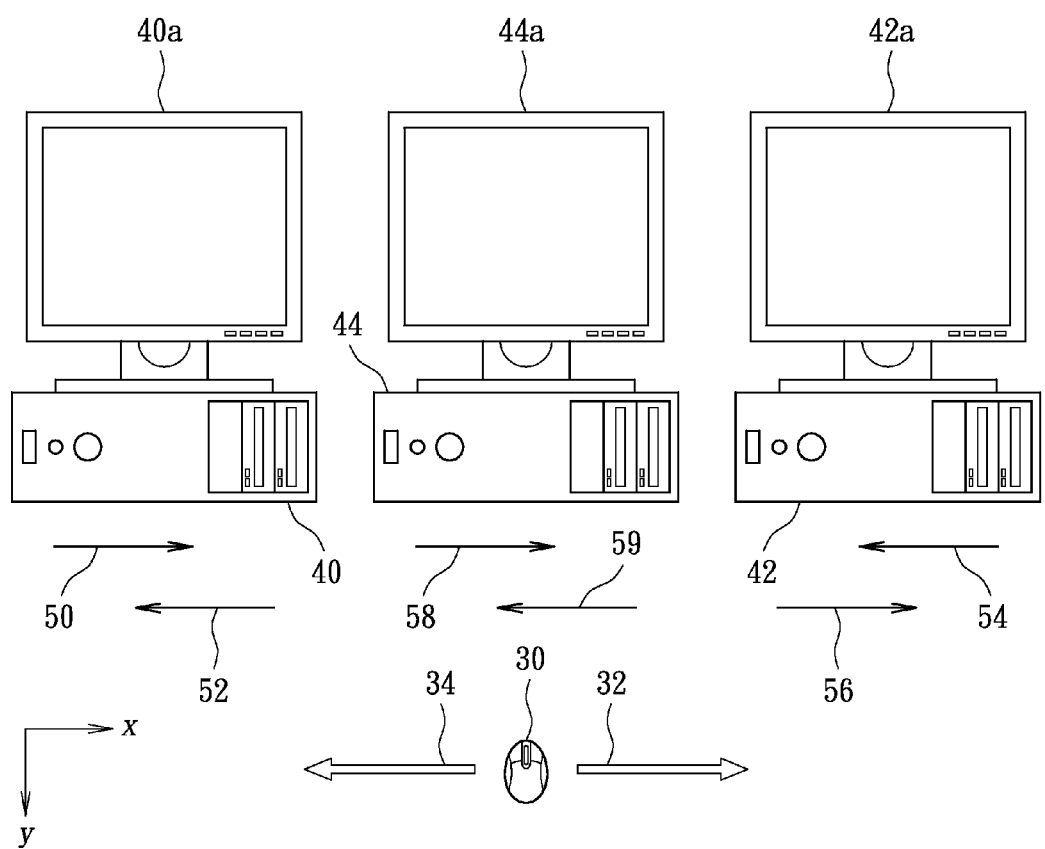
FIG. 5 is an illustration of a further exemplary embodiment of an input device for controlling multiple computers.

Please refer to FIG. 5, which is a schematic diagram of an exemplary embodiment of another input device which is able to be switched among multiple computers. Comparing to FIG. 3, the instant embodiment further includes a third computer 44 and a third monitor 44a which is mounted between the first monitor 40a and the second monitor 42a in the horizontal arrangement. Please refer to FIG. 5 in conjunction with FIG. 2.

In the exemplary embodiment of the instant invention, taking the third computer 44 as the controlled computer for example, the first moving direction 32 and the second moving direction 34 of the input device 30 correspond to the first pointer direction 58 and the second pointer direction 59 of the third computer 44, respectively. Wherein the first pointer direction 58 is toward the second monitor 42a from the third monitor 44a, and the second pointer direction is toward the first pointer direction from the third monitor 44a. When the input device 30 is in control of the third computer 44, the controlling unit 302 determines that the pointer on the third monitor 44a moves toward the first pointer direction 58 based on the calculated first moving direction 32 and accumulates the displacement value toward the first pointer direction 58 to be the first accumulated displacement value. When the first accumulated displacement value is larger than the threshold value, the controlling unit 302 determines switching the input device 30 to another computer. In order to conform to the user's operating habit, the controlling unit 302 may determine switching the input device 30 to the second computer 42 for controlling and makes the pointer operable on the second monitor 42a.

On the contrary, if the controlling unit 302 determines that the pointer on the third monitor 44a moves toward the second pointer direction 59 based on the calculated second moving direction, it accumulates the displacement value toward the second pointer direction 59 to be the second accumulated displacement value. When the second accumulated displacement value is larger than the threshold value, the controlling unit 302 determines that the input device 30 should be switched to the further computer over than the another computer. In the exemplary embodiment of the instant invention, the controlling unit 302 switches the input device 30 to the first computer 40 and makes the pointer operable on the first monitor 40a.

It is worth to note, in order to make the controlling unit 302 exactly correspond to the switched computer, the storing unit 304 in the instant embodiment can further record flags corresponding to the first pointer direction and the second pointer direction of each computer among the multiple computers operated by the input device 30. For example, the first flag corresponding to the first pointer direction 50 of the first computer 40 indicates the third computer 44, and the first flag corresponding to the first pointer direction 54 of the second computer 42 also indicates the third computer 44. While the first flag corresponding to the first pointer direction 58 of the third computer 44 indicates the second computer 42, and the second flag corresponding to the second pointer direction 59 of the third computer 44 indicates the first computer 44. Whereby the controlling unit 302 switches the input device 30 to the computer exactly based on the corresponsive flag calculated by the first pointer direction or the second pointer direction of the controlled computer. The flags can be recorded in a form as a look up table for the controlling unit 302 to refer to.

In the aforementioned embodiments, in order to avoid accumulating the displacement value in different direction together, the controlling unit 302 accumulates the first accumulated displacement value and clears the second accumulated displacement value when the input device 30 moves toward the first pointer direction 58. On the contrary, when the input device 30 moves toward the second pointer direction 59, the controlling unit accumulates the second accumulated displacement value and clears the first accumulated displacement value.

Whereby recording the first pointer direction and the second pointer direction of each one of computers, the controlling unit 302 can determine that the input device 30 should be switched to which computer exactly when the user moves the input device 30 substantially toward a specific direction even though the quantity of the multiple computers is more than two.

Specially, in other embodiments, there are other methods for determining that the input device 30 should be switched to which computer besides recording the flags corresponding to each pointer direction. For example, the user can set different threshold values according to the relative position between each monitor and other monitors, and the controlling unit 302 switches the input device 30 to the different computer based on comparing the displacement value with different threshold values. Please refer to FIG. 5, for example, the user can set two threshold values: the first threshold value and the second threshold value, for the first pointer direction 50 of the first computer 40. We assume that the first threshold value is larger than 3000 pixels and the second threshold value is lager than 6000 pixels.

When the input device 30 is in control of the first computer 40 and moves continuously toward the first moving direction 32, the controlling unit 302 calculates the first accumulated displacement value toward the first pointer direction 50 and determines whether the first accumulated displacement value is larger than the second threshold value. If the first accumulated displacement value is larger than the second threshold value (in this case, the input device 30 slides the distance succeed 6000 pixels at one move), the controlling unit 302 determines that the input device 30 is switched to the further computer (in this case, the second computer 42). If the first accumulated displacement value is not larger than the second accumulated displacement value, then determining whether the second accumulated displacement value is larger than the first threshold value. When the first accumulated displacement value is between the first threshold value and the second threshold value, the controlling unit 302 determines that the input device 30 is switched to the near computer (in this case, the third computer 44).

Similarly, taking the second computer 42 as the controlled computer for example, the user can also set the first threshold value and the second threshold value for being compared with the first accumulated displacement value corresponding to the first pointer direction 54. When the first accumulated displacement value is larger than the second threshold value, the controlling unit 302 determines that the input device 30 is switched to the further computer (in this case, the first computer 40) from the second computer 42. While the first accumulated displacement value is between the first threshold value and the second threshold value, the controlling unit 302 determines that the input device 30 is switched to the near computer (in this case, the third computer 44) from the second computer 42.

By the method that comparing the accumulated displacement value in the same direction with several threshold values, the user can switch the input device 30 to different computers according to the displacement value conformed to different threshold values. In other words, when the input device 30 moves toward the same direction and makes the magnitude of a single move larger, it is more probable to make a pointer cross multiple monitors and move on the further monitor. The threshold value is also stored previously in the storing unit 304 for the controlling unit 302 to read and match, or by setting numerical values directly in the program for the controlling unit 302 to determine.

With the specification of aforementioned embodiments, the instant invention provides an input device may be switched among multiple computers not only in horizontal arrangement but also in vertical arrangement. In the same theory, the input device can be switched exactly among multiple computers even though the arrangement of monitors is not in the straight line.

[An Exemplary Embodiment of a Method for the Input Device to Control Multiple Computers]

Figure 6:
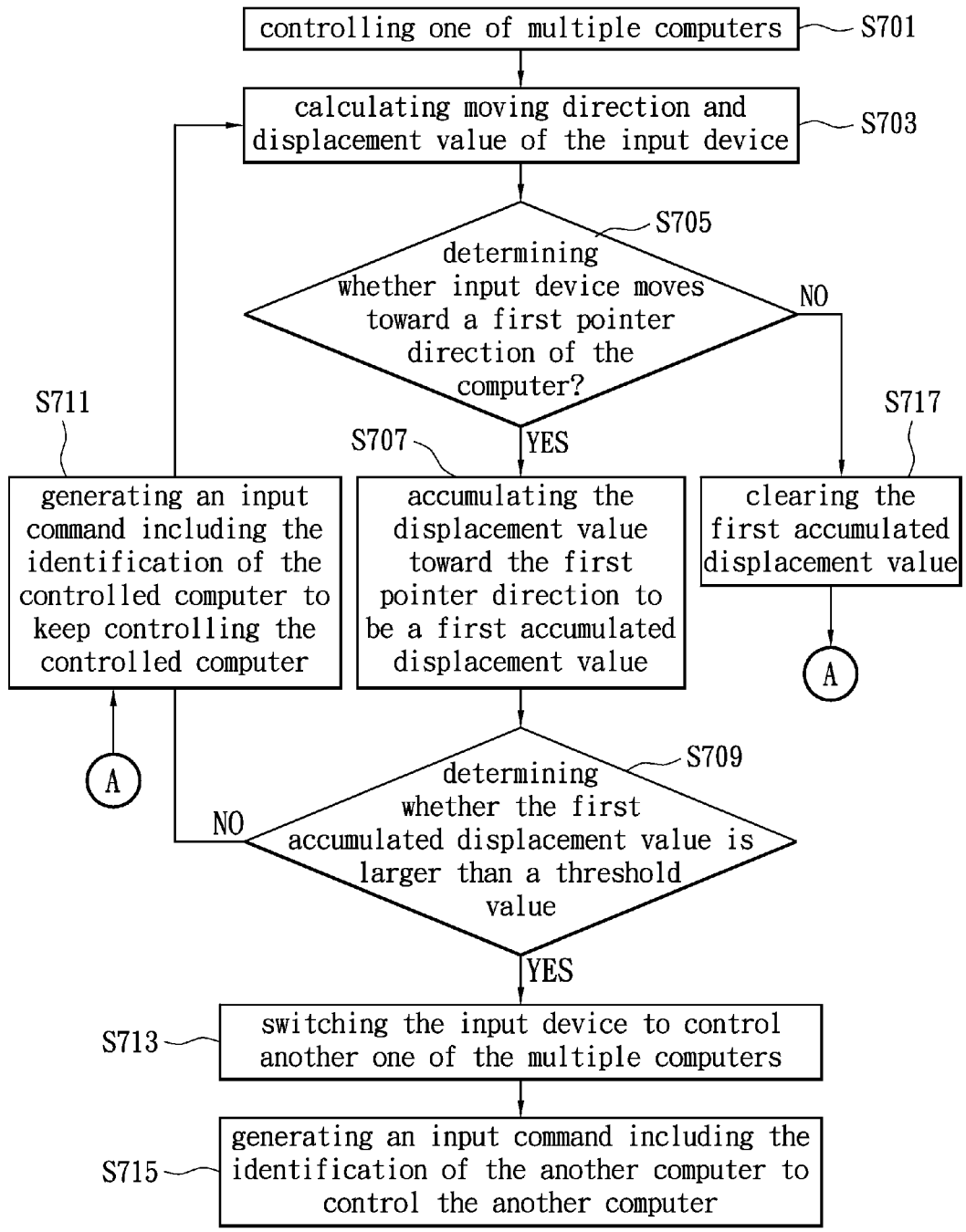
FIG. 6 is a flowchart illustrating an exemplary embodiment of a method about an input device for controlling multiple computers.

Please refer to FIG. 6, in conjunction with FIG. 2 and FIG. 3, FIG. 6 shows a flow diagram illustrating a method for the input device to control multiple computers in an exemplary embodiment of the instant disclosure. The input device 30 and multiple computers (the first computer 40 and the second computer 42, as shown in FIG. 2), in the instant embodiment, are connected through the wireless transmission, and the input device 30 can be in control of one of the multiple computers at the same time. (predetermining the first computer 40 as the controlled computer) (S701) The controlling unit 302 in the input device 30 calculates the moving direction and the displacement value of the input device 30 based on the variation of the displacement detected by the sensing unit 300. (S703) The moving direction of the input device 30 includes a first moving direction 32 and a second moving direction 34 corresponding to the first pointer direction 50 and the second pointer direction 52 of the first computer 40, respectively. Thereby when the input device 30 moves toward the first moving direction 32, the pointer of the first computer 40 will move toward the first pointer direction. The controlling unit 302 determines whether the input device 30 moves to the first pointer direction 50 corresponding to the first computer 40 based on the calculated moving direction. (S705) In the exemplary embodiment of the instant invention, the moving direction of the input device 30 may be horizontal direction.

If the moving direction of the input device 30 corresponds to the first pointer direction 50 of the first computer 40, the controlling unit 302 can further accumulate the displacement value to be the first accumulated displacement value when the input device 30 moves continuously toward the first pointer direction 50. (S707) And determining whether the first accumulated displacement value is larger than the threshold value. (S709) The threshold value may be numeric value pre-stored in the storing unit 304, for example, the threshold value may be a value larger than the pixels of resolution of any monitor connected to the input device 30. If the first accumulated displacement value is not larger than the threshold when the input device 302 moves toward the first pointer direction 50, the controlling unit 302 determines that the user still operate the input device 30 being in control of the first computer 40. At this moment, the controlling unit 302 generates the input command including the identification of the controlled computer and transmits the input command to the controlled computer (in this case, the first computer 40). (S711) Whereby when the multiple computers connected to the input device 30 receive the input command transmitted from the transmitting unit 306, only the computer with the corresponsive identification (in this case, the first computer 40) will execute the input command. Thereby getting the effect of controlling the first computer 40 by the input device 30. After generating and transmitting the input command, the controlling unit 302 can return to the step S703 to keep on calculating the moving direction and the displacement value of the input device 30 based on the variation of the displacement detected by the sensing unit 300.

Further, in the step S709, when determining that the first accumulated displacement value is larger than the threshold value, the controlling unit 302 determines that the input device 30 should be switched to another computer of the multiple computers (S713), the second computer 42 in the instant embodiment. (please refer to FIG. 3) When the controlling unit 302 determines to switch the input device 30 to the second computer 42 for controlling, the controlling unit 302 generates another input command including the identification of the second computer 42. While the first computer 40 and second computer 42 receive the input command, only the second computer 42 with the corresponsive identification will execute the input command and be controlled by the input device 30. (S715)

On the other way, when the controlling unit 302 determines that the moving direction of the input device 30 is not corresponding to the first pointer direction 50 of the first computer 40, it represents that the moving direction of the input device 30 is corresponding to the second pointer direction 52 of the first computer 40. To avoid the controlling unit 302 accumulating the displacement value toward the second pointer direction 52 to be the first accumulated displacement value, the controlling unit 302 clears the first accumulated displacement value (S717), and return to the step S711 to generate the input command including the identification of the first computer 40 for the first computer 40 receiving and executing.

Similarly, when the input device 30 is in control of the second computer 42, the user also can switch the input device 30 to be in control of the first computer 40 from the second computer 42 through the procedure as shown in FIG. 6. The controlling unit 302 only need to determine the relative position between the pointer direction of the second computer 42 and the moving direction of input device 30 previously, for example, determining whether the first pointer direction 54 corresponds to the second moving direction 34 and the second pointer direction 56 corresponds to the first moving direction 32, as shown in FIG. 3.

[Another Embodiment of a Method for the Input Device to Control Multiple Computers]

Figure 7:
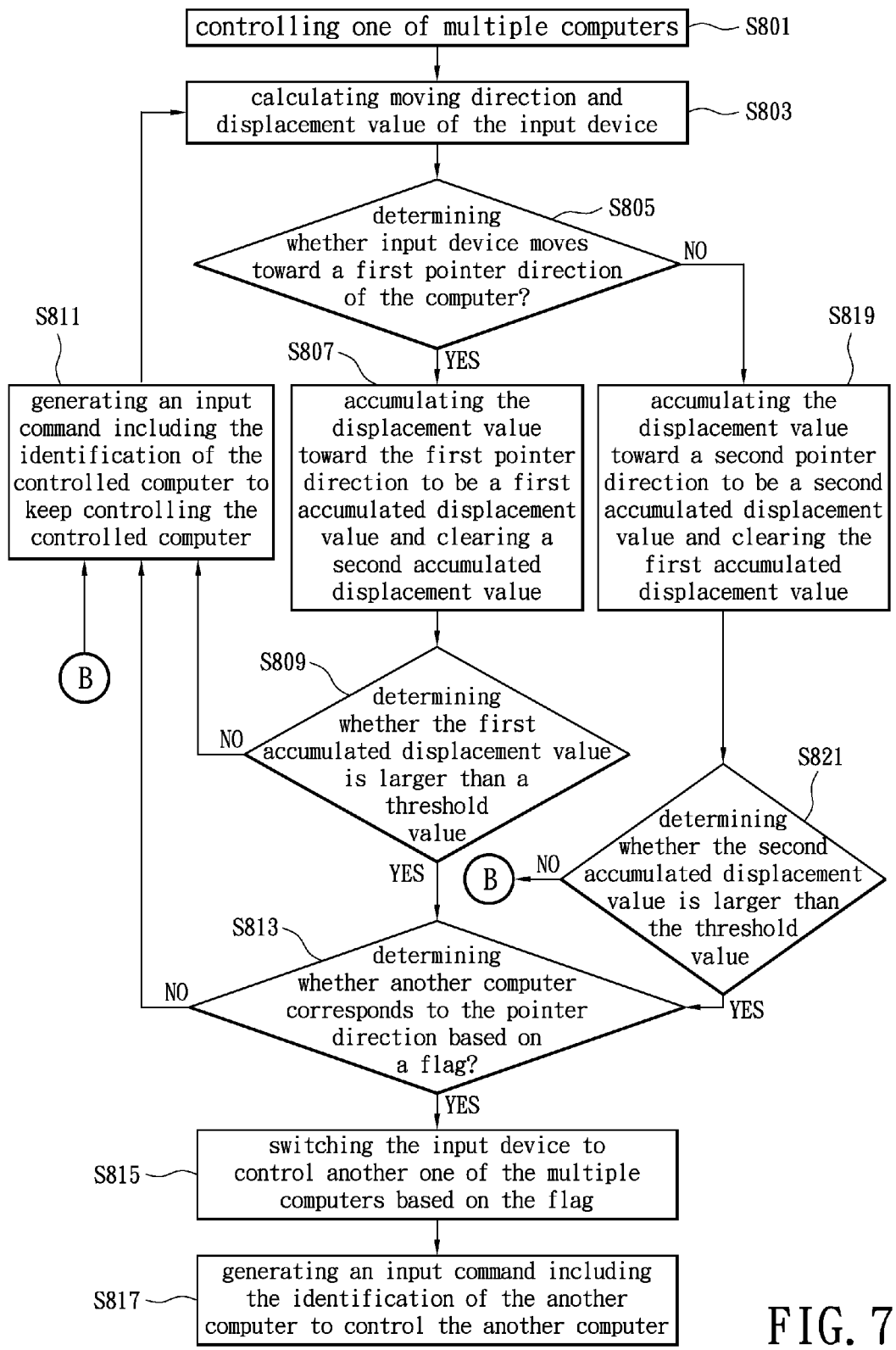
FIG. 7 is a flowchart illustrating another exemplary embodiment of method about an input device for controlling multiple computers.

Please refer to FIG. 7, in conjunction with FIG. 2 and FIG. 5, FIG. 7 shows another flow diagram illustrating a method for the input device to control multiple computers in an exemplary embodiment of the instant invention.

Similar to the aforementioned embodiments, the input device 30 and multiple computers (in the instant embodiment, the first computer, the second computer and the third computer) are connected through the wireless transmission, and the input device 30 can be in control of one of the multiple computers at the same time. (predetermining the third computer as the controlled computer) (S801) The controlling unit 302 in the input device 30 calculates the moving direction and the displacement value of the input device 30 based on the variation of the displacement detected by the sensing unit 300. (S803) The moving direction of the input device 30 includes a first moving direction 32 and a second moving direction 34 corresponding to the first pointer direction 58 and the second pointer direction 59 of the third computer, respectively. Thereby when the input device 30 moves toward the first moving direction 32, the pointer of the third computer will move toward the first pointer direction 58. The controlling unit 302 determines whether the input device 30 moves toward the first pointer direction 58 corresponding to the third computer based on the calculated moving direction. (S805) In the exemplary embodiment of the instant invention, the moving direction of the input device 30 may be horizontal direction.

If the moving direction of the input device 30 corresponds to the first pointer direction 58 of the third computer, the controlling unit 302 can further accumulate the displacement value to be the first accumulated displacement when the input device 30 moves continuously toward the first pointer direction 58. At the same time, the controlling unit 302 clears the second accumulated displacement value which is accumulated when the input device 30 moves toward the second pointer direction 59 previously (S807) to avoid accumulating the displacement value that the input device is not moving toward the first pointer direction 58 to be the first accumulated displacement value. And the controlling unit 302 determines whether the first accumulated displacement value is larger than the threshold value, (S809) to determine whether the input device 30 generates a substantial move. If the first accumulated displacement value is not larger than the threshold value, the controlling unit 302 determines that the user still operate the input device being in control of the third computer. At this moment, the controlling unit 302 generates the input command including the identification of the third computer according to the operation of the user, (S811) in order to confirm that only the third computer with the corresponsive identification will execute the input command after all computers receive the input command. After generating and transmitting the input command, the controlling unit can return to the step S803 to keep on calculating the moving direction and the displacement value of the input device 30 based on the variation of the displacement detected by the sensing unit 300.

After determining that the first accumulated displacement value is larger than the threshold value in the step S809, the controlling unit 302 further determines whether there is a flag corresponding to the first pointer direction 58 of the third computer (S813), such as contrasting the flag with the lookup table stored in the storing unit 300. For example, the flag corresponding to the first pointer direction 58 of the third computer in the lookup table is the identification of the second computer, and the flag corresponding to the second pointer direction 52 of the first computer indicates no corresponsive computer. Whereby the controlling unit 302 determines that the input device 30 should be switched to another computer (in the instant embodiment, the second computer) from the controlled computer (in the instant embodiment, the third computer) based on the flag, when the first accumulated displacement value corresponding to the first pointer direction 58 of the third computer is lager than the threshold value. (S815) The controlling unit 302 generates the input command including the identification of the second computer for the second computer receiving and executing. (S817) On the other way, if the referred flag of the step S813 indicates that the input device 30 moves toward a direction of a specific computer and there is no corresponsive computer, the input device is still in control of the same computer. Thereby the controlling unit 302 generates the input command including the identification of the controlled computer for controlling. (S811)

On the other way, when determining that the moving direction of the input device 30 is not corresponding to the first pointer direction 58 of the third computer in the step S805, it represents that the moving direction of the input device 30 is corresponding to the second pointer direction 59 of the third computer. The controlling unit 302 clears the first accumulated displacement value of the step S807, and accumulates the displacement value to be the second accumulated displacement value when the input device 30 moves toward the second pointer direction 59. (S819) The controlling unit 302 further determines whether the second accumulated displacement value is larger than the threshold value (S821), in order to confirm whether the input device 30 moves substantially toward the second pointer direction 59.

If the second accumulated displacement value is larger than the threshold value when the input device 30 moves toward the second pointer direction 59, the controlling unit 302 determines whether there is a further computer corresponding to the present controlled computer (in the instant embodiment, the third computer). If the flag corresponding to the second pointer direction 59 of the third computer is the identification of the second computer, the controlling unit 302 switches the input device 30 to the second computer based on the flag to control the second computer and generates the input command including the identification of the second computer for the input device 30 to control the second computer. (S817)

Additionally, the user can set the threshold value in several stages to determine whether the first accumulated displacement value is larger than the threshold value and to switch the input device 30 to another computer according to the comparison result. Taking the first computer 40 in FIG. 5 for example, the threshold value compared with the first accumulated displacement value corresponding to the first computer 40 can be set to be the first threshold value corresponding to the third computer 44, e.g. 3000 pixels, and the second threshold corresponding to the second computer 42, e.g. 6000 pixels, respectively.

When the input device 30 is in control of the first computer 40 and the controlling unit 302 determines that the pointer moves toward the first pointer direction 50 based on detection of the sensing unit 300, the controlling unit 302 determines whether the calculated first accumulated displacement value is larger than the second threshold value. In other words, it represents to determine whether the input device 30 crosses two monitor in a horizontal move. If the first accumulated displacement value is larger than the second threshold value, the controlling unit 302 switches the input device 30 to the further second monitor 42a connected to the second computer 42 from the first monitor 40a. On the contrary, if the first accumulated displacement value is between the first threshold value and the second threshold value, the controlling unit 302 switches the input device 30 to the near third monitor 44a connected to the third computer 44 from the first monitor 40a.

Whereby when the quantity of the multiple computers connected to the input device 30 is at least three, the controlling unit 302 still can determine which computer should be switched exactly according to the moving direction, the pointer direction corresponding to the computer and the displacement, and generate the input command including the exact identification.

In the instant embodiment in FIG. 5, although it takes the monitors connected to the computers in horizontal arrangement for example, it still can be based on the same theory to switch the input device 30 when the quantity of the monitors connected to the computers is at least three in vertical arrangement, and description therefore is omitted.

[Another Embodiment of the Input Device Switching Multiple Computers]

Figure 8A:
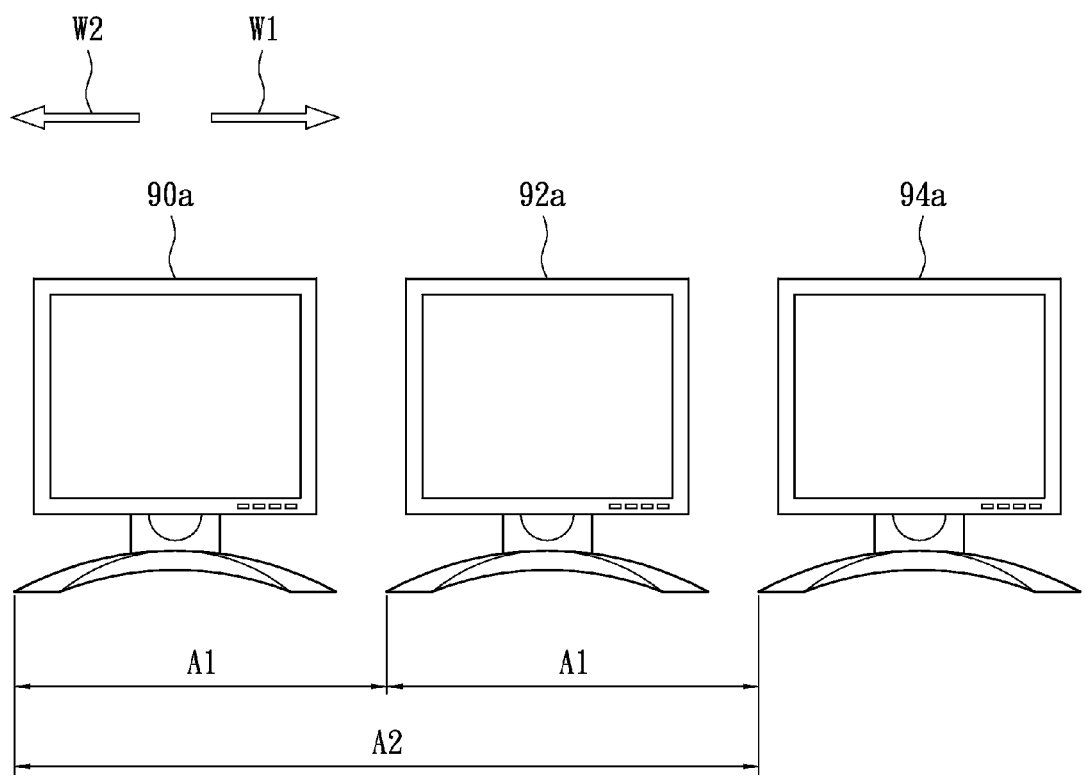
FIG. 8A to 8C are illustrations of another exemplary embodiment of input device for controlling multiple computers.
Figure 8B:
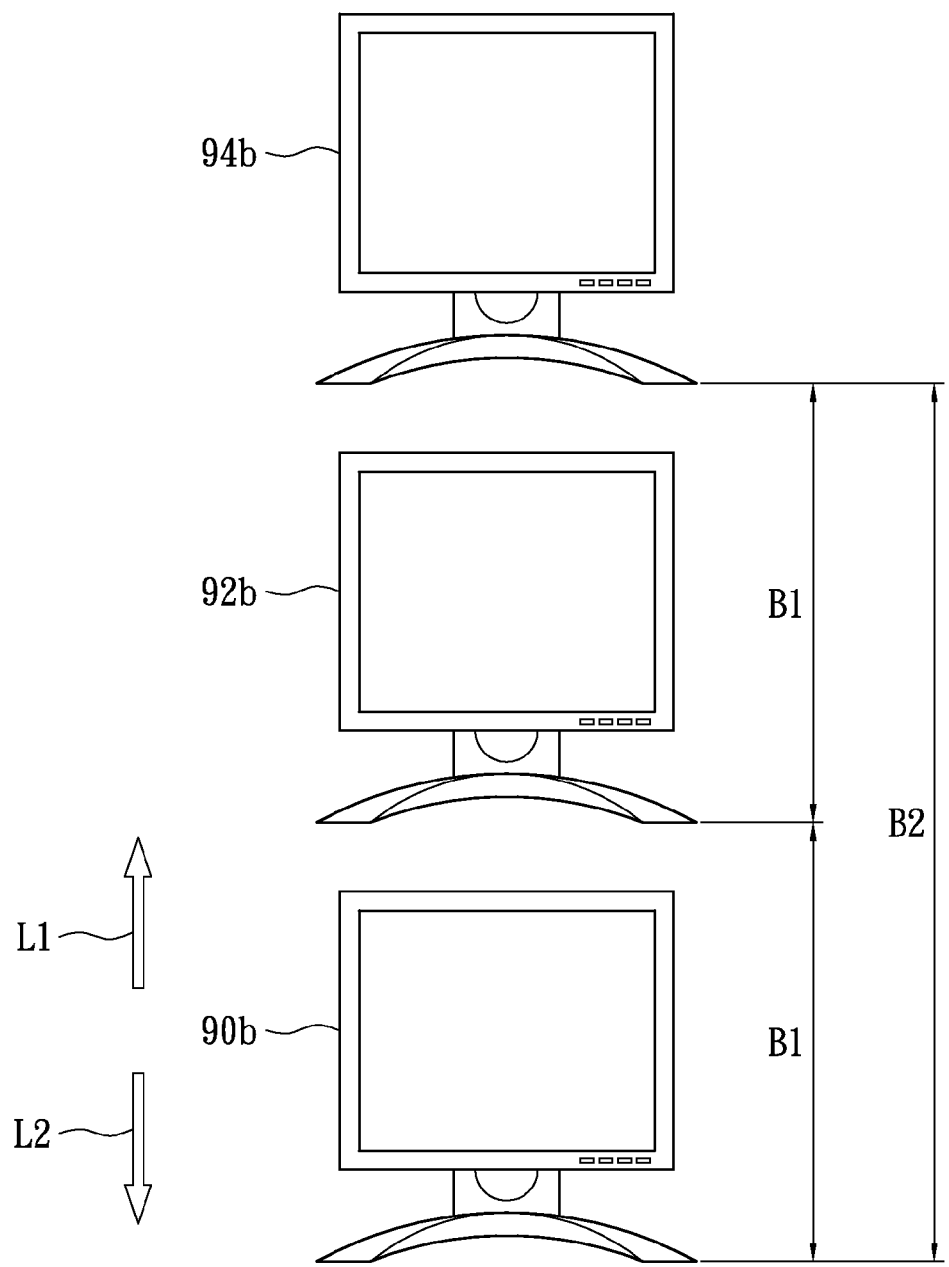
Figure 8C:
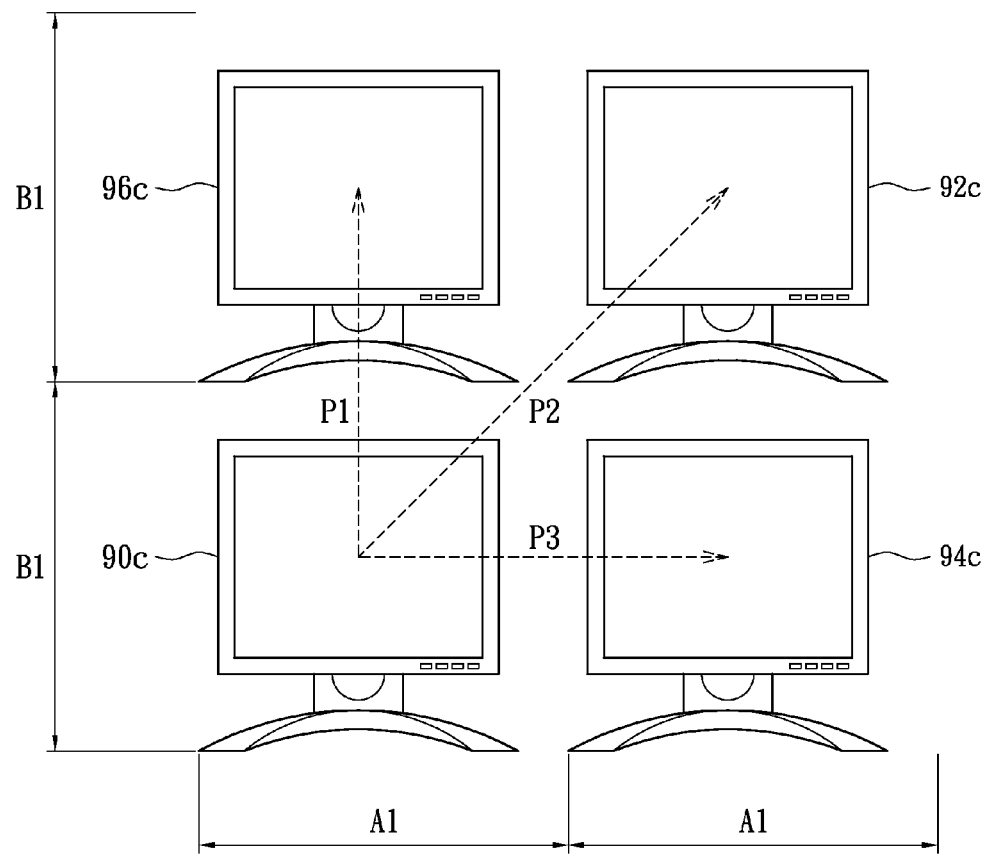
Figure 8C:
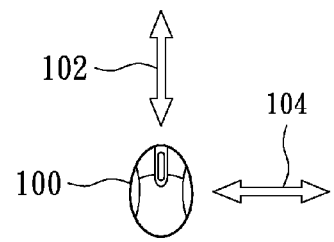

Please refer to FIG. 8A to FIG. 8C, which show an illustration of an exemplary embodiment of another input device switching multiple computers.

FIG. 8A shows a first monitor 90a connected to the first computer, a second monitor 92a connected to the second computer, and a third monitor 94a connected to the third computer controlled by the input device (each computer is not shown in FIG. 8A), and the monitors are arranged in order on the same horizontal axis. Please refer to FIG. 8A in conjunction with FIG. 3, similar to the first pointer direction 50 and the second pointer direction 52 of the first monitor 40a in FIG. 3, the pointer direction of the first monitor 90a in FIG. 8A is in horizontal direction including the a first latitudinal direction W1 toward the second monitor 92a and a second latitudinal direction W2 opposite to W1. Similar to the description of the embodiment in FIG. 3, the controlling unit of the input device (not shown in FIG. 8A) calculates the moving direction and displacement value of the input device. When the input device moves continuously toward the first latitudinal direction W1 and accumulates the horizontal accumulated displacement value larger than the horizontal threshold value A1, the input device is switched to the second monitor 92a corresponding to the second computer. When the horizontal moving direction corresponds to the second latitudinal direction W2, it clears the accumulated horizontal displacement value to avoid switching the wrong computer.

Similarly, if the horizontal displacement value corresponding to the first latitudinal direction W1 of the first computer is twice larger than the horizontal threshold value A1 (in the instant embodiment, A2 in FIG. 8A), the input device switches to the third monitor 94a connected to the third computer from the first computer.

In the instant embodiment, the horizontal threshold A1 may be 3000 pixels for example, or pixels larger than the maximum resolution of a single monitor on the same horizontal axis. The other description of the input device switching multiple monitors corresponding to the computers in the horizontal arrangement on the same axis is specified on the aforementioned embodiments, and description is therefore omitted.

Please refer to FIG. 8B, when the first monitor 90b, the second monitor 92b, and the third monitor 94b are arranged in order from bottom to top on the same vertical axis, the pointer direction of the first monitor 90b includes a first longitudinal direction L1 toward the second monitor 92b and a second longitudinal direction L2 opposite to L1.

As same as shown in FIG. 4, When the input device moves continuously toward the first longitudinal direction L1 and accumulates the vertical accumulated displacement value larger than the vertical threshold value B1, the input device is switched to the second monitor 92b corresponding to the second computer. On the contrary, when the input device moves toward the second longitudinal direction L2 or the vertical accumulated displacement value toward the first longitudinal direction L1 is not larger than the vertical threshold B1, the input device remains controlling the same computer on the same axis.

Similarly, if the vertical displacement value corresponding to the first longitudinal direction L1 of the first monitor 90b connected to the first computer is twice larger than the vertical threshold B1 (in the instant embodiment, B2 in FIG. 8B), the input device is switched to the third monitor 94b connected to the third computer from the first computer.

In the instant embodiment, the vertical threshold B1 may be 2500 pixels for example, or pixels larger than the maximum resolution of a single monitor on the same vertical axis. The other description of the input device switching multiple monitors corresponding to the computers in the horizontal arrangement on the same axis is specified on the aforementioned embodiments, and description is therefore omitted.

Please refer to FIG. 8C, which shows an illustration of multiple monitors on different horizontal axis or on different vertical axis. Wherein the horizontal moving direction 104 of the input device 100 is able to correspond to the first latitudinal direction and the second latitudinal direction of the first monitor 90c, and the vertical moving direction 102 of the input device 100 is able to correspond to the first longitudinal direction and the second longitudinal direction of the first monitor 90c. Wherein the first latitudinal direction is toward the third monitor 94c on the same horizontal axis with the first monitor 90c, and the first longitudinal direction is toward the fourth monitor 96c on the vertical axis with the first monitor 90c. While the second monitor 92c and the fourth monitor 96c are on the same horizontal axis, and the second monitor 92c and the third monitor 94c are on the same vertical axis.

When the input device 100 is operated on the first monitor 90c of the first computer, the moving direction of the input device 100 may both includes a horizontal moving direction and a vertical moving direction at the same time. The controlling unit of the input device (not shown in FIG. 8C) will calculate both the displacement values in horizontal direction and in vertical direction. When the horizontal moving direction corresponds to the first latitudinal direction and the vertical moving direction corresponds to the first longitudinal direction, the controlling unit calculates the horizontal displacement value and the vertical displacement value and determines whether the corresponsive displacement value is larger than the horizontal threshold value A1 and the vertical threshold value B1, respectively.

If the horizontal displacement value is larger than the horizontal threshold value A1 and the vertical displacement value is not larger than the vertical threshold value B1, the controlling unit will switch the input device 100 to the third monitor 94c of the third computer on the same horizontal axis. (Please refer to the description in FIG. 8A) In other words, the pointer of the input device 100 is displayed originally on the first monitor 90c, after moving toward direction P3 the pointer is switched to be displayed on the third monitor 94c. On the contrary, if only the vertical displacement value is larger than the vertical threshold B1, the input device 100 is switched to the fourth monitor 96c of the fourth computer on the same vertical axis (Please refer to the description in FIG. 8B). It also represents that the pointer is switched to be displayed on the fourth monitor after moving toward direction P1.

Specially, when both the horizontal displacement value is larger than the horizontal threshold value A1 and the vertical displacement value is larger than the vertical threshold value B1 which represents that the horizontal displacement and the vertical displacement both change substantially, whereby the input device 100 moves toward direction P1 on the same vertical axis with the fourth computer 96c and moves toward direction P3 on the horizontal axis with the third computer 94c. Thereby the pointer moves toward direction P2, and the pointer is switched to be displayed on the second monitor 92c located on the diagonally corner of the first monitor 90c from the first monitor 90c.

In the exemplary embodiment of the instant invention, the horizontal threshold value A1 may be pixels larger than the maximum resolution of any single monitor on the same horizontal axis. Since pixels of a normal monitor on the horizontal axis is larger than pixels on the vertical axis, the vertical threshold value B1 may be pixels larger than the maximum resolution of any single monitor on the same vertical axis and not larger than the horizontal threshold value A1.

The methods about the controlling unit of the input device calculating the moving direction and the displacement value, accumulating and clearing the displacement value based on the corresponsive moving directions are specified on the aforementioned embodiments, and description on the instant embodiment is therefore omitted.

[Probable Effects of the Embodiments]

According to the embodiments of the instant invention, the aforementioned input device and controlling method thereof provide the user with an input device used for switching and controlling multiple computers.

Further, the aforementioned embodiments disclose the input device for controlling multiple computers and the controlling method thereof provide a method about switching multiple computers which receives the input command of the input device according to calculating the moving direction and the displacement value, whereby the moving direction of the input device corresponds to the pointer direction on the computer. Thereby achieving the effect of intuitive and easy to operate.

Furthermore, based on the embodiment of the instant invention, the input device can switch the pointer between more than one row or more than one column of monitors connected to computers according to calculating the horizontal displacement value and the vertical displacement value of the input device. And controlling the monitor connected to the computer corresponding to the host to enhance flexibility of the input device used for switching multiple computers.

Additionally, by taking advantage of the controlling of the input device calculating the variation of the displacement to determine which computer to be controlled and the identification that indicate which computer should be switched to, the user can implement the switching and controlling procedures totally through the firmware. Comparing to set extra switches or KVM on the input device, the embodiment of the instant invention provides an input device with simple structure and no extra hardware cost.

The aforementioned descriptions represent merely the exemplary embodiment of the instant disclosure, without any intention to limit the scope of the instant disclosure thereto. Various equivalent changes, alternations or modifications based on the claims of instant disclosure are all consequently viewed as being embraced by the scope of the instant disclosure.

What is claimed is:

1. An input device for controlling multiple computers, with each computer being connected to a monitor, comprising:
a storing unit, recording identification of each one of the multiple computers;
a sensing unit, detecting a displacement of the input device;
a controlling unit, calculating a horizontal moving direction, a vertical moving direction, a horizontal displacement value of the horizontal moving direction, and a vertical displacement value of the vertical moving direction according to the displacement detected by the sensing unit, so as to determine a first computer of the multiple computers of which the input device is in control, and generating an input command for controlling the first computer, in which the input command comprises the identification of the first computer; and
a transmitting unit, electronically connected to the controlling unit, transmitting the input command to the multiple computers to have the first computer corresponding to the identification executing the input command;
wherein the horizontal moving direction corresponds to a latitudinal pointer direction of a first monitor connected to the first computer and the vertical moving direction corresponds to a longitudinal pointer direction of a first monitor connected to the first computer, in which the latitudinal pointer direction comprises a first latitudinal direction and a second latitudinal direction, the longitudinal pointer direction comprises a first longitudinal direction and a second longitudinal direction, wherein the controlling unit accumulates the horizontal displacement value to be a horizontal accumulated displacement value when the input device moves successively toward the first latitudinal direction and accumulates the vertical displacement value to be a vertical accumulated displacement value when the input device moves successively toward the first longitudinal direction, once the horizontal accumulated displacement value is larger than a horizontal threshold value and the vertical accumulated displacement value is larger than a vertical threshold value, the controlling unit switches the input device to control a second computer of the multiple computers, in which a second monitor connected to the second computer and the first monitor are not in the same horizontal axle or in the same vertical axle.

2. The input device according to claim 1, wherein when the horizontal accumulated displacement value is larger than the horizontal threshold value and the vertical accumulated displacement value is not larger than the vertical threshold value, switching the input device to control a third computer of the multiple computers, in which a third monitor connected to the third computer and the first monitor are in the same horizontal axle.

3. The input device according to claim 2, wherein when the horizontal accumulated displacement value is not larger than the horizontal threshold value and the vertical accumulated displacement value is larger than the vertical threshold value, switching the input device to control a fourth computer of the multiple computers, in which a fourth monitor connected to the fourth computer and the first monitor are in the same vertical axle.

4. The input device according to claim 3, wherein the second monitor and the third monitor are in the same vertical axle, and the second monitor and the fourth monitor are in the same horizontal axle.

5. The input device according to claim 1, wherein when the horizontal accumulated displacement value is not larger than the horizontal threshold value and the input device moves toward the second latitudinal direction, the controlling clears the horizontal accumulated displacement value, when the vertical accumulated displacement value is not larger than the vertical threshold value and the input device moves toward the second longitudinal direction, the controlling clears the vertical accumulated displacement value.

6. The input device according to claim 1, wherein the transmitting unit comprises a wireless communication module, each one of the multiple computers comprises a wireless communication receiving unit for reading the identification of the input command respectively, wherein one of the multiple computers corresponding to the identification of the input command executes the input command transmitted wirelessly from the wireless communication module.

7. The input device according to claim 1, wherein the first latitudinal direction is opposite to the second latitudinal direction and the first longitudinal direction is opposite to the second longitudinal direction.

8. The input device according to claim 1, wherein the input device comprises a mouse and the controlling unit is configured inside the mouse.

* * * * *